Sept. 25, 1962 L. H. MORIN 3,055,166
TRAVELER WITH WIRE SUPPORTED WEAR RESISTANT ELEMENT
Filed Aug. 12, 1960
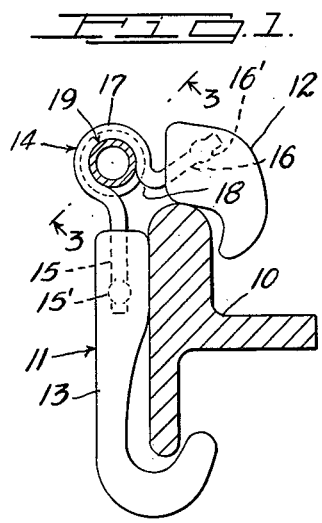
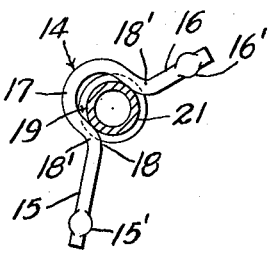
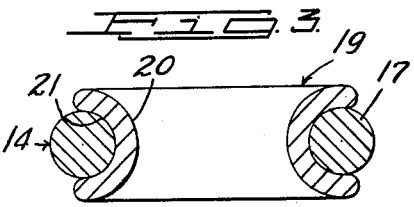
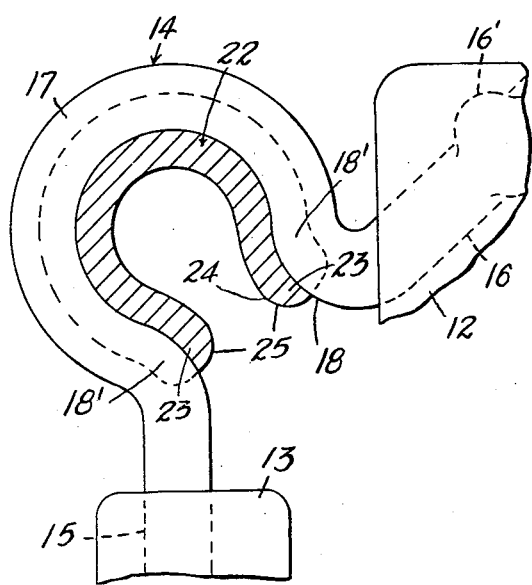
INVENTOR.
LOUIS H. MORIN
BY
ATTORNEY United States Patent Office 3,055,166
Patented Sept. 25, 1962

3,055,166
TRAVELER WITH WIRE SUPPORTED WEAR
RESISTANT ELEMENT
Louis H. Morin, Bronx, N.Y., assignor to Coats & Clark
Inc., New York, N.Y., a corporation of Delaware
Filed Aug. 12, 1960, Ser. No. 49,351
3 Claims. (Cl. 57—125)

This invention relates to travelers employing a pair of molded and preferably plastic hook-shaped leg members coupled and spaced by a spring wire insert anchored in each of the leg members of the traveler and fashioned to form an open loop having a contracted neck, thereby adapting the insert for support of a wear resistant element positioned between adjacent end portions of said leg members.

More particularly, the invention deals with a traveler of the character described, wherein the wear resistant element presents within the loop of the insert smooth rounded surfaces for free action of the traveler.

Still more particularly, the invention deals with a traveler structure of the character described, wherein the spring loop of the insert facilitates attachment of the wear resistant element therewith.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a traveler ring illustrating one of my improved travelers mounted thereon, with the wear resistant element of the traveler shown in section.

FIG. 2 is a diagrammatic view of the insert, illustrating attachment of the wear resistant element with the open loop of the insert.

FIG. 3 is an enlarged section on the line 3—3 of FIG. 1; and

FIG. 4 is an enlarged detail view of adjacent end portions of the legs of a traveler, such as shown in FIG. 1, illustrating a modified form of wear resistant element.

In FIG. 1 of the drawing, I have shown, in section, at 10 a traveler ring and at 11 one of my improved travelers, the traveler comprising two leg members 12 and 13 for engagement of the ring 10 in a manner as diagrammatically illustrated in the drawing. The leg members are formed from cast or molded material, preferably plastic, such as nylon or the like, and these leg members are formed on an insert 14 composed of spring wire and having ends 15 and 16, including indents 15', 16' for anchorage of the ends in the leg members, as will clearly appear from a consideration of FIG. 1 of the drawing. The central portion of the insert 14 is fashioned to form an open spring loop 17, including a contracted neck portion 18. The neck portion 18 opens at adjacent spaced ends of the leg members 12 and 13.

At 19 I have shown a wear resistant element, preferably formed of a ceramic material, such, for example, as a product known as "Alsimag." The element 19, in the construction shown in FIGS. 1 and 2, is in the form of a ring having a smooth rounded inner surface 20, note FIG. 3 of the drawing, and a rounded annular recess or channel 21 for reception of the loop 17. The engagement of the loop 17 with the element 19 can be a close, but free, fit to facilitate rotation of the element within the loop 17.

In the diagrammatic illustration in FIG. 2 of the drawing, the spring insert 14 is illustrated as flexed to spread the contracted neck 18 formed by the rounded portions 18' in the loop sufficiently to facilitate insertion of the element 19 in the loop, after which, the rounded portions 18' will again contract, producing the contracted neck 18, as noted in FIG. 1 of the drawing.

In FIG. 4 of the drawing, I have shown a slight modification, where the structure of the traveler, including the leg members, and the insert 14 are identical with the structure shown in FIG. 1, thus like references will identify like parts. In FIG. 4, I have shown a modified form of element at 22, the element 22 differing from the element 19 in being substantially horseshoe-shaped in cross-sectional form, or in other words, having free laterally flaring end portions 23 at the opening 24 in said element but, aside from this modification, a cross-section through the showing in FIG. 4 on a line similar to 3—3 of FIG. 1 would give the same structural contour as shown in FIG. 3 of the drawing. The flared ends 23 of the element 22 will engage the rounded portions 18' at the neck 18 of the insert 14 and will thus definitely position the element 22 in the loop 17, as will clearly appear from a consideration of FIG. 4 of the drawing. The exposed surfaces of the flared ends 23 are rounded, as seen at 25. The spacing between the rounded portions 18', at the neck of the insert, is less than the diameter of the channel 21 in the element 22, thus retaining the element against displacement from the insert while, at the same time, facilitating attachment of the element, as previously pointed out.

By virtue of the simplicity and economy in the structure of the traveler and the fact that the insert adapts itself for the casting of the legs 12 and 13 thereon in accordance with known methods, a very desirable traveler is produced and one having a very practical and efficient wear resistant element.

Having fully described my invention, what I claim as new and desire to secure by Letters Patent is:

1. A traveler for a spinning ring comprising a pair of resilient plastic leg members joined and spaced by a spring wire insert, said insert embedded in one end only of each of said leg members and including an open ring-type loop providing a contracted neck at the opening of said loop, said loop supporting a wear resistant element, said element having rounded smooth inner surfaces, the periphery of said element including a channel in which the loop of said insert seats in support of the element against displacement in one direction on said insert, and said spring wire insert having enough resiliency to permit spreading of said neck to introduce said element into said loop to retain the element against displacement through the opening in said loop during use of said traveler including the attachment and removal thereof from said ring.

2. A traveler for a spinning ring comprising a pair of resilient plastic leg members joined and spaced by a spring wire insert, said insert embedded in one end only of each of said leg members and including an open ring-type loop providing a contracted neck at the opening of said loop, said loop supporting a wear resistant element, said element having rounded smooth inner surfaces, said element being in the form of a ring, the outer periphery of which includes an annular channel in which the loop of said insert seats, said spring wire insert having enough resiliency to permit spreading of said neck to introduce said element into said loop to retain the element against displacement through the opening in said loop during use of said traveler including the attachment and removal thereof from said ring.

3. A traveler for a spinning ring comprising a pair of resilient plastic leg members joined and spaced by a spring wire insert, said insert embedded in one end only of each of said leg members and including an open ring-type loop providing a contracted neck at the opening of said loop, said loop supporting a wear resistant element, said element having rounded smooth inner surfaces, said element being horseshoe-shaped in form defining flared ends on said element, the periphery of the element having a channel in which the loop of said insert seats, and said spring wire insert having enough resiliency to permit spreading of said neck to introduce said element into said loop, the flared end of said element engaging the contracted neck portion of the insert in retaining the element against displacement from said insert during use of said traveler including the attachment and removal thereof from said ring.

References Cited in the file of this patent

UNITED STATES PATENTS

| | | |
|---|---|---|
| 2,132,260 | Fillinger | Oct. 4, 1938 |
| 2,919,080 | Moore | Dec. 29, 1959 |

FOREIGN PATENTS

| | | |
|---|---|---|
| 296,224 | Great Britain | Aug. 30, 1928 |